United States Patent
Yanagisawa

[11] Patent Number: 5,945,189
[45] Date of Patent: Aug. 31, 1999

[54] MAGNETIC RECORDING MEDIUM INCLUDING MICA SUBSTRATE

[75] Inventor: Masahiro Yanagisawa, Tokyo, Japan

[73] Assignee: NEC Corporation, Japan

[21] Appl. No.: 08/763,213

[22] Filed: Dec. 10, 1996

[30] Foreign Application Priority Data

Dec. 13, 1995 [JP] Japan .................................. 7-324263

[51] Int. Cl.$^6$ .............................. G11B 5/62; G11B 5/704; B32B 19/04
[52] U.S. Cl. .................................. 428/65.3; 428/674 TS; 428/694 BR; 428/694 ST; 428/450; 369/288
[58] Field of Search ........................ 428/694 T, 694 TS, 428/694 TP, 694 TR, 694 TM, 694 B, 694 BS, 694 BR, 694 ST, 694 SL, 694 SG, 64.1, 64.2, 64.3, 65.3, 65.6, 450, 454; 369/288, 283

[56] References Cited

U.S. PATENT DOCUMENTS

| | | |
|---|---|---|
| 4,530,734 | 7/1985 | Klima . |
| 4,786,558 | 11/1988 | Sumiya et al. ............... 428/454 |
| 4,833,001 | 5/1989 | Kijima et al. ................ 428/141 |
| 4,908,727 | 3/1990 | Ezaki et al. .................. 360/135 |
| 4,971,932 | 11/1990 | Alpha et al. ................... 501/3 |
| 5,605,565 | 2/1997 | Feldstein ..................... 106/1.22 |
| B1 4,971,932 | 1/1995 | Alpha et al. ................... 501/3 |

FOREIGN PATENT DOCUMENTS 2-247821  10/1990  Japan .

OTHER PUBLICATIONS

Webster's New World Dictionary, V. Neufeldt (ed.), p. 894, 1988 (no month).

Primary Examiner—John J. Zimmerman
Assistant Examiner—Michael LaVilla
Attorney, Agent, or Firm—Ostrolenk, Faber, Gerb & Soffen, LLP

[57] ABSTRACT

In a magnetic recording medium, a substrate is made of mica having a cleavage surface, and a magnetic recording layer is formed on the cleavage surface.

12 Claims, 4 Drawing Sheets

MAGNETIC RECORDING MEDIUM INCLUDING MICA SUBSTRATE

BACKGROUND OF THE INVENTION

1. Field of the Invention

The present invention relates to a magnetic recording medium used as a magnetic disk or the like.

2. Description of the Related Art

Magnetic recording media, particularly, magnetic disk units, have been used in information storage files. In a magnetic disk unit, in order to increase the recording density, a spacing between a magnetic head and a magnetic disk should be preferably as small as possible. That is, the smaller this spacing, the larger the recording density of information per one track and the larger the density of tracks.

In order to reduce the above-mentioned spacing, it is necessary to flatten the surface of a magnetic recording layer of the magnetic disk as much as possible. For this purpose, in a prior art magnetic disk, a glass substrate or nickel-phosphrus plated aluminum alloy substrate is used. For example, a glass ceramic substrate including a crystal phase structure formed by groups of sheet silicic acid and chain silicate is used (see JP-A-2-247821). Also, a substrate is formed by adding fillers into amorphous resin. A magnetic recording layer is formed on such a substrate.

In the above-mentioned prior art magnetic disk, however, even if the substrate is finely ground, the evenness of the substrate in terms of atom levels cannot be obtained, and as a result, the spacing between the magnetic head and the magnetic disk cannot be less than 10 nm.

SUMMARY OF THE INVENTION

It is an object of the present invention to provide a completely flat magnetic recording medium in terms of atom levels.

According to the present invention, in a magnetic recording medium, a substrate is made of mica having a cleavage surface, and a magnetic recording layer is formed on the cleavage surface. The cleavage surface of the mica substrate is completely flat in terms of atom levels.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Figure 1:
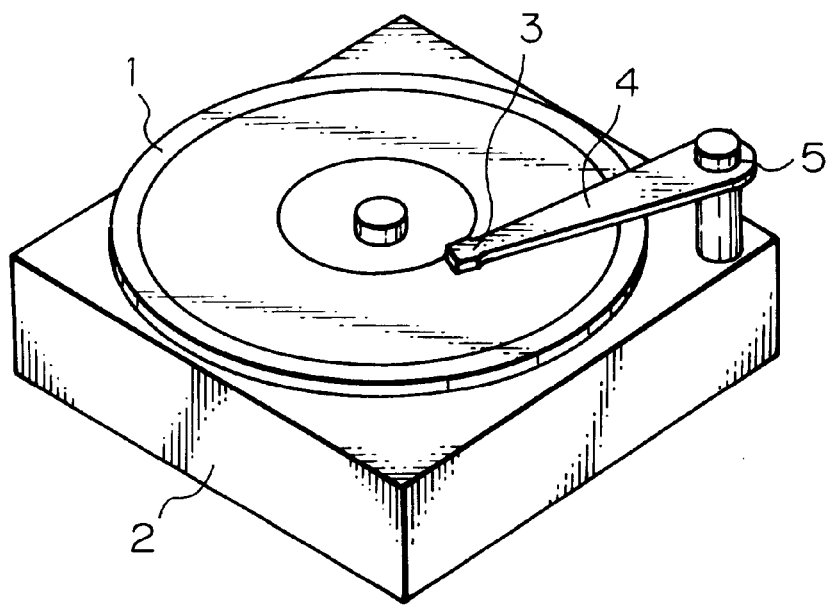
FIG. 1 is a perspective view illustrating a magnetic disk unit to which the present invention is applied.

In FIG. 1, which illustrates a magnetic disk unit to which the present invention is applied, a magnetic disk 1 is mounted on a rotational driving unit 2, so that the magnetic disk 1 can rotate at a high speed. Also, a magnetic head 3 is fixed to an end of an arm 4 whose other end is rotatably mounted on a scanning unit 5. As a result, the magnetic head 3 is arranged in close proximity to a surface of the magnetic disk 1, and also can move along a radius direction of the magnetic disk 1.

Figure 2:
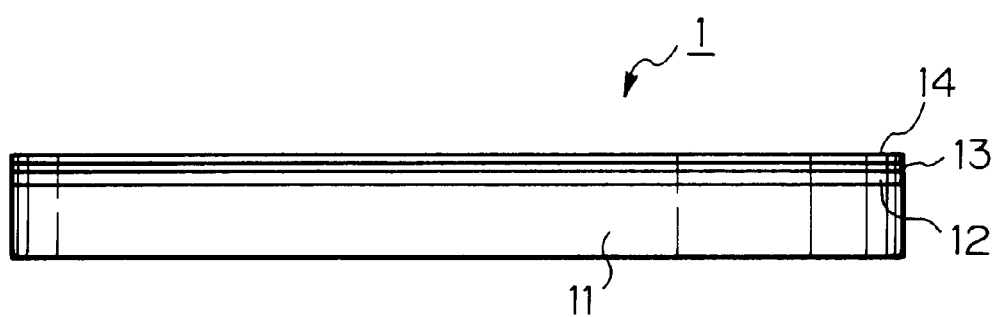
FIG. 2 is a cross-sectional view illustrating a first embodiment of the magnetic disk according to the present invention.

In FIG. 2, which illustrates a first embodiment of the magnetic disk according to the present invention, the magnetic disk 1 is comprised of a substrate 11 made of mica, a magnetic recording layer 12 formed on a cleavage surface of the substrate 11, a protection layer 13 formed on the magnetic recording layer 12, and a lubricant layer 14 is formed on the protection layer 13 for obtaining a good sliding movement of the magnetic head 3.

Figure 3:
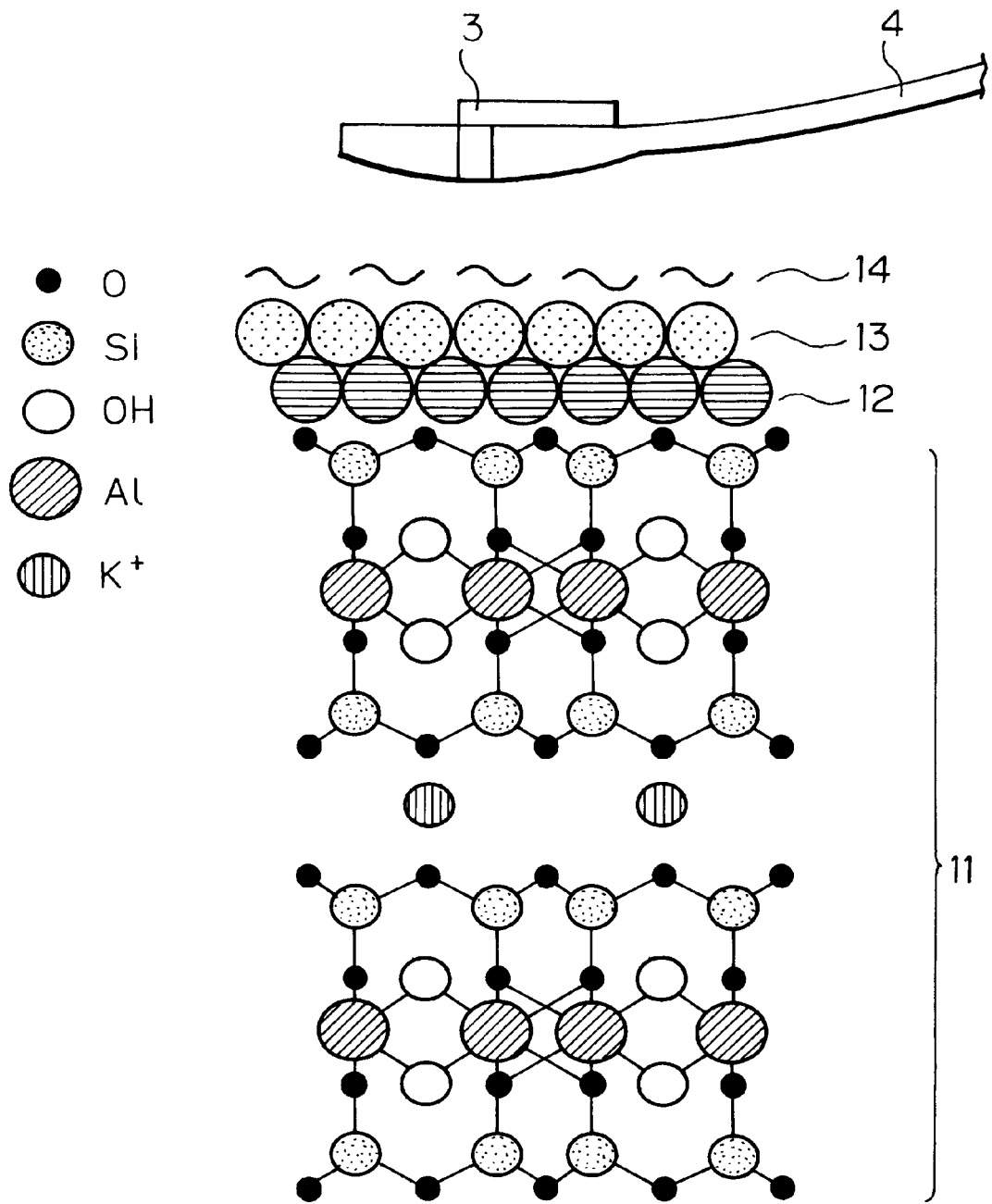
FIG. 3 is an enlargement of the magnetic disk of FIG. 1.

As illustrated in FIG. 3, the mica of the substrate 11 is a kind of layer compound formed by a plurality of layers including oxygen (O), silicon (Si), hydroxyl group (OH) and aluminum (Al), the layers being combined weakly by potassium ions ($K^+$), sodium ions ($Na^+$) or calcium ions ($Ca^{++}$). Therefore, the cleavage surface of the substrate 11 is easily obtained by releasing the weak combination by the above-mentioned ions. Also, the cleavage surface of the substrate 11 is completely plain in terms of atom levels.

Since the cleavage surface of the substrate 11 is completely plain in terms of atom levels, the surface of the magnetic recording layer 12 and the surface of the protection layer 13 are completely plain in terms of atom levels.

For example, an about 1.1 mm thick, 2.54 cm (1 inch)-diameter mica plate is prepared, and a thickness of about 0.1 mm is scraped to form a cleavage surface of the substrate 11. Then, an about 20 nm thick CoPtCr alloy film is deposited as the magnetic recording layer 12 by a sputtering process on the cleavage surface of the substrate 11. Further, an about 5 nm thick carbon film is deposited as the protection layer 13, and then, an about 2 nm thick perfluoro-polyether film is deposited as the lubricant layer 14. As a result, the spacing between the magnetic recording layer 12 and the magnetic head 3 can be about 10 nm in terms of atom levels.

Figure 4:
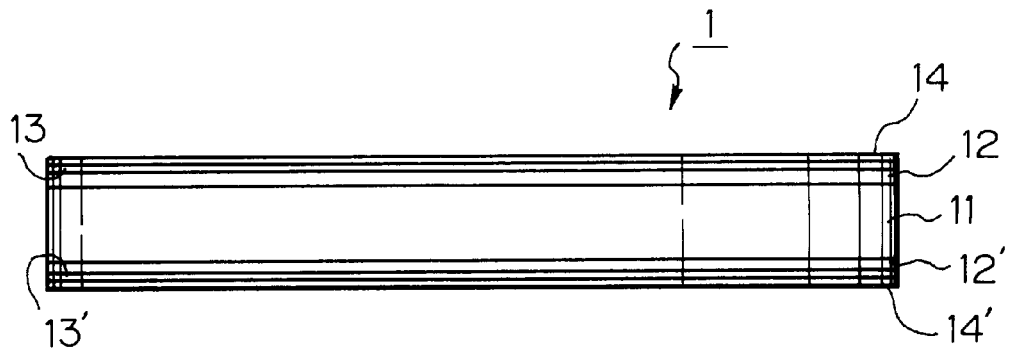
FIG. 4 is a cross-sectional view illustrating a second embodiment of the magnetic disk according to the present invention.

In FIG. 4, which illustrates a second embodiment of the magnetic disk according to the present invention, in the magnetic disk 1 of FIG. 2, another magnetic recording layer 12' is formed on another cleavage surface of the substrate 11, another protection layer 13' is formed on the magnetic recording layer 12', and another lubricant layer 14' is formed on the protection layer 13'. Thus, both sides of the magnetic disk 1 are accessible.

Figure 5:
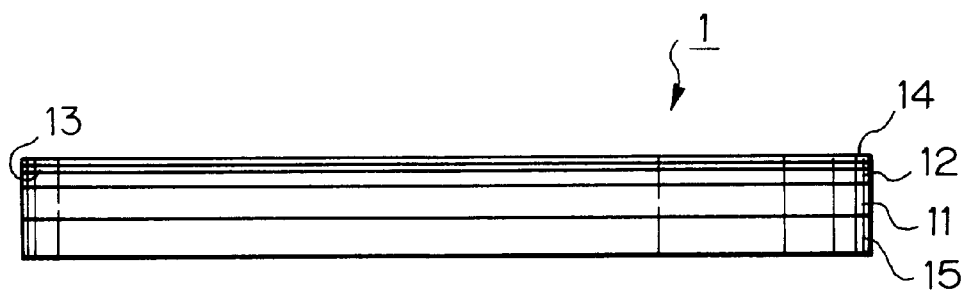
FIG. 5 is a cross-sectional view illustrating a third embodiment of the magnetic disk according to the present invention.
Figure 6:
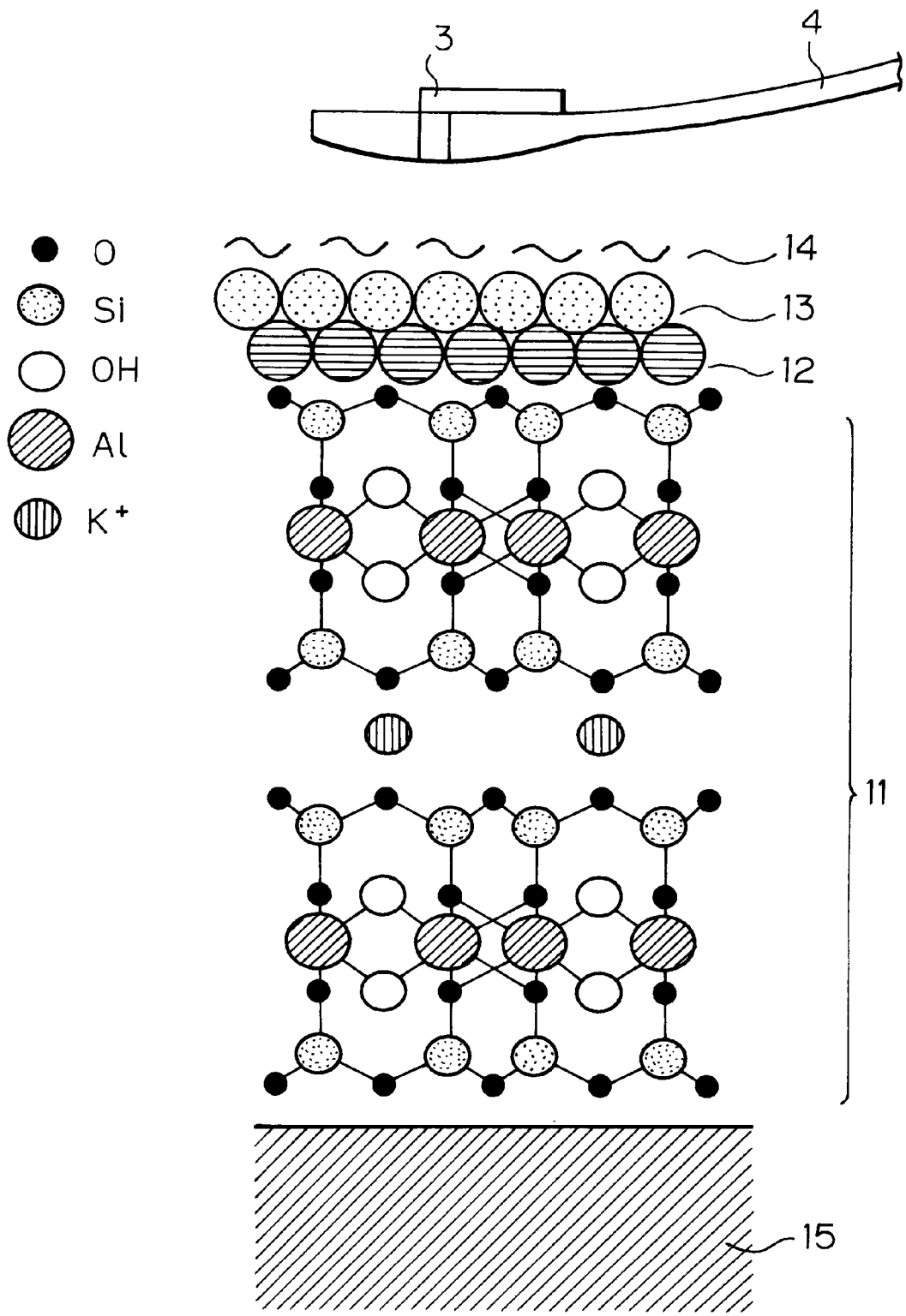
FIG. 6 is an enlargement of the magnetic disk of FIG. 5.

In FIG. 5, which illustrates a third embodiment of the magnetic disk according to the present invention, a base 15 is added to the elements of FIG. 2. That is, as illustrated in FIG. 6, another cleavage surface of the substrate 11 is adhered to the base 15, thus increasing the mechanical strength of the magnetic disk 1. The base 15 is made of glass, aluminum alloy, nickel-phosphrus plated aluminum alloy, carbon or anodized aluminum alloy.

Figure 7:
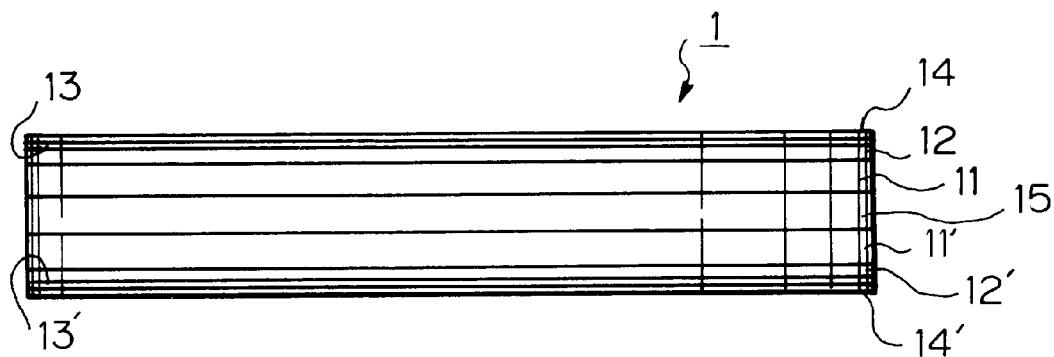
FIG. 7 is a cross-sectional view illustrating a fourth embodiment of the magnetic disk according to the present invention.

In FIG. 7, which illustrates a second embodiment of the magnetic disk according to the present invention, in the magnetic disk 1 of FIG. 5, another substrate 11' is formed on another surface of the base 15, another magnetic recording layer 12' is formed on the substrate 11', another protection layer 13' is formed on the magnetic recording layer 12', and another lubricant layer 14' is formed on the protection layer 13'. Thus, both sides of the magnetic disk 1 are accessible.

According to the inventor's experiments, a minimum floating amount of the magnetic head 3 with respect to the magnetic disk 1 was about 1 nm detected by using an acoustic emission sensor. Note that, with this minimum floating amount, the magnetic head 3 is not in contact with the magnetic disk 1. Contrary to this, such a minimum floating amount in the prior art was about 20 nm. Also, according to the present invention, when the magnetic head 3 is in contact with the magnetic disk 1 while the magnetic disk 1 is rotating, a jumping amount of the magnetic head 3 was about 0.2 nm detected by an optical interference meter. Contrary to this, in the prior art, such a jumping amount was about 30 nm. Thus, the evenness characteristics of the magnetic disk 1 according to the present invention is remarkably improved.

Note that the present invention can be applied to other magnetic recording medium than the magnetic disk.

As explained hereinabove, according to the present invention, the evenness of the magnetic recording medium such as the magnetic disk can be improved, which is helpful in increasing the recording density.

I claim:

1. A magnetic recording medium comprising:
   a substrate made of mica having a cleavage surface, said mica being made of a compound formed by a plurality of layers made of oxygen, silicon, hydroxyl group and aluminum, said layers being combined by potassium ions, sodium ions or calcium ions; and
   a magnetic recording layer formed on the cleavage surface.

2. The magnetic recording medium as set forth in claim 1, further comprising a base to which said substrate is mounted.

3. The magnetic recording medium as set forth in claim 2, wherein said base is made of one of glass, aluminum alloy, nickel-phosphorus plated aluminum alloy, carbon and anodized aluminum alloy.

4. The magnetic recording medium as set forth in claim 1, further comprising:
   a protection layer formed on the magnetic recording layer; and
   a lubricant layer formed on said protection layer.

5. The magnetic recording medium as set forth in claim 1, being a magnetic disk.

6. A magnetic recording medium comprising:
   a substrate made of mica having first and second cleavage surfaces, said mica being made of a compound formed by a plurality of layers made of oxygen, silicon, hydroxyl group and aluminum, said layers being combined by potassium ions, sodium ions or calcium ions;
   a first magnetic recording layer formed on said first cleavage surface; and
   a second magnetic recording layer formed on said second cleavage surface.

7. The magnetic recording medium as set forth in claim 6, further comprising:
   a first protection layer formed on first magnetic recording layer;
   a second protection layer formed on said second magnetic recording layer;
   a first lubricant layer formed on said first protection layer; and
   a second lubricant layer formed on said second protection layer.

8. The magnetic recording medium as set forth in claim 6, being a magnetic disk.

9. A magnetic recording medium comprising:
   a base having first and second surfaces;
   a first substrate made of mica formed on the first surface of said base and having a first cleavage surface, said mica being made of a compound formed by a plurality of layers made of oxygen, silicon, hydroxyl group and aluminum, said layers being combined by potassium ions, sodium ions or calcium ions;
   a second substrate made of mica formed on the second surface of said base and having a second cleavage surface;
   a first magnetic recording layer formed on said first cleavage surface; and
   a second magnetic recording layer formed on said second cleavage surface.

10. The magnetic recording medium as set forth in claim 9, wherein said base is made of one of glass, aluminum alloy, nickel-phosphorus plated aluminum alloy, carbon and anodized aluminum alloy.

11. The magnetic recording medium as set forth in claim 9, further comprising:
    a first protection layer formed on said first magnetic recording layer;
    a second protection layer formed on said second magnetic recording layer;
    a first lubricant layer formed on said first protection layer; and
    a second lubricant layer formed on said second protection layer.

12. The magnetic recording medium as set forth in claim 9, being a magnetic disk.

* * * * *